US011038957B2

United States Patent
Brower

(10) Patent No.: US 11,038,957 B2
(45) Date of Patent: *Jun. 15, 2021

(54) APPARATUS AND METHOD FOR EFFICIENT, COORDINATED, DISTRIBUTED EXECUTION

(71) Applicant: Bloomberg Finance L.P., New York, NY (US)

(72) Inventor: Hendrik Brower, Fair Lawn, NJ (US)

(73) Assignee: Bloomberg Finance L.P., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/904,474

(22) Filed: Jun. 17, 2020

(65) Prior Publication Data

US 2020/0322427 A1 Oct. 8, 2020

Related U.S. Application Data

(63) Continuation of application No. 15/815,160, filed on Nov. 16, 2017, now Pat. No. 10,728,320, which is a continuation of application No. 14/522,274, filed on Oct. 23, 2014, now Pat. No. 9,854,028.

(51) Int. Cl.
*H04L 29/08* (2006.01)
*G06F 11/30* (2006.01)
*H04L 12/24* (2006.01)

(52) U.S. Cl.
CPC ...... *H04L 67/1051* (2013.01); *G06F 11/3006* (2013.01); *H04L 41/0816* (2013.01); *H04L 67/10* (2013.01)

(58) Field of Classification Search
CPC . H04L 67/1051; H04L 41/0816; H04L 67/10; G06F 11/3006
See application file for complete search history.

(56) References Cited

U.S. PATENT DOCUMENTS

| 6,934,952 B2* | 8/2005 | Sarkar ............... H04L 29/06 709/209 |
| 7,386,586 B1 | 6/2008 | Headley et al. |
| 8,201,000 B2* | 6/2012 | Boss ............... G06F 1/3203 713/320 |
| 8,239,709 B2* | 8/2012 | Hom ............... G06F 11/0793 714/38.1 |
| 8,717,895 B2* | 5/2014 | Koponen ........... H04L 41/0816 370/235 |
| 9,866,625 B2* | 1/2018 | Onishi ............... H04L 51/24 |
| 10,140,157 B2* | 11/2018 | Blaine ............... G06F 9/4881 |
| 2004/0153714 A1* | 8/2004 | Kjellberg ............. H04L 43/0817 714/4.1 |
| 2004/0216136 A1 | 10/2004 | Laschkewitsch et al. |
| 2004/0230636 A1 | 11/2004 | Masuoka et al. |
| 2012/0166621 A1 | 6/2012 | Sharma et al. |

* cited by examiner

*Primary Examiner* — Aaron N Strange
(74) *Attorney, Agent, or Firm* — Chiesa Shahinian & Giantomasi PC

(57) ABSTRACT

The present disclosure describes a system and method for efficient, coordinated, distributed execution. Processes are registered into a process registry which includes a table or list of processes. Processes which are determined to be no longer running are removed from the registry. Each process is configured to send a broadcast when it starts or stops. Each process periodically reads the registry, sorts the list, and uses it to determine the current master process based on an algorithm.

20 Claims, 4 Drawing Sheets

APPARATUS AND METHOD FOR EFFICIENT, COORDINATED, DISTRIBUTED EXECUTION

CROSS-REFERENCE TO RELATED APPLICATIONS

This application is a continuation of U.S. patent application Ser. No. 15/815,160, filed Nov. 16, 2017, which is a continuation of U.S. patent application Ser. No. 14/522,274, filed Oct. 23, 2014 and issued as U.S. Pat. No. 9,854,028, the disclosures of which are incorporated herein by reference in their entirety.

BACKGROUND

In a distributed processing environment, computational tasks may be assigned to a plurality of nodes or processes for execution. A central server may manage the scheduling of the system such that the processing ability of each node that executes a task may be fully exploited and the load of computations of the node may be optimized so that each task may be executed efficiently. However, improvements are needed to address inefficiencies which arise when processes abruptly stop running (i.e., go "down") or when "up"/"down" messages broadcast from processes are not received by other processes.

SUMMARY

Embodiments of the present disclosure facilitate coordinating distributed execution among processes to limit concurrent execution to a known level, enable distributing (or not distributing) execution over time among a population of processes, and increase efficiency by reducing load on system resources. In accordance with an embodiment of the present disclosure, a process registry comprising a table is created and stored on a server computer. Each process is registered in the process registry such that the registry includes information relating to a plurality of processes. Processes are registered by storing at least unique identifiers corresponding to the processes in the table. A copy of the process registry is transmitted to each process such that each process maintains a local copy of the process registry. Each process is configured to periodically transmit to the server computer and to each other process a message indicating a status of the process. The process registry stored on the server computer is updated in response to messages received from processes. A process is removed from the registry if it is determined that the process is no longer running. A process is determined to no longer be running if (1) a "down" message is received from a process; (2) a process has not broadcast its status within a predetermined amount of time; or (3) the last ping time in the registry is prior to a predetermined time. Each process is also configured to read the process registry stored on the server computer and, in response to determining that a process has been removed from the registry (because the process is no longer running), select, using an algorithm, which process of the plurality of processes is a master process. In one embodiment, a new master process is also periodically selected using the algorithm (e.g., a master process is selected every 10 seconds regardless of whether a process has stopped running).

In accordance with an embodiment, the algorithm to determine which process is a master process is in the form of:

primary master process index=[((time+offset)/rotate period) % no. of processes]

In accordance with an embodiment, each process is configured to read the registry stored on the server computer and update its respective local copy of the registry (1) on a predetermined schedule (e.g., every 30 seconds); and (2) upon receiving "up" or "down" broadcast messages from other processes.

The embodiments described herein may furthermore be carried out on a computing device that performs operations based on execution of code stored on a non-transitory computer readable medium.

In accordance with an embodiment of the present disclosure, a non-transitory computer readable medium having executable code stored thereon, that when executed, causes a computing device to perform at least the following steps: creating and storing, on a server computer, a process registry, said process registry comprising a table; registering each process of the plurality of processes in the process registry by storing at least unique identifiers corresponding to the plurality of processes in the table; transmitting a copy of the process registry to each process of the plurality of processes such that each process of the plurality of processes maintains a local copy of the process registry, wherein each process periodically transmits to the server computer and to each process of the plurality of processes a message indicating a status of the process; updating the process registry stored on the server computer in response to the received message; and removing a process from the registry if it is determined that the process is no longer running wherein each process of the plurality of processes is configured to periodically read the process registry stored on the server computer, and in response to determining that the process has been removed from the registry, select, using an algorithm, a master process from the plurality of processes.

The embodiments described herein may furthermore be carried out on a system comprising at least a server computer comprising a processor. The processor may be configured for creating and storing, on a server computer, a process registry, said process registry comprising a table; registering each process of the plurality of processes in the process registry by storing at least unique identifiers corresponding to the plurality of processes in the table; transmitting a copy of the process registry to each process of the plurality of processes such that each process of the plurality of processes maintains a local copy of the process registry, wherein each process periodically transmits to the server computer and to each process of the plurality of processes a message indicating a status of the process; updating the process registry stored on the server computer in response to the received message; and removing a process from the registry if it is determined that the process is no longer running wherein each process of the plurality of processes is configured to periodically read the process registry stored on the server computer, and in response to determining that the process has been removed from the registry, select, using an algorithm, a master process from the plurality of processes.

The aforementioned embodiments and other advantages of the embodiments described herein will be apparent to those of ordinary skill in the art at least by reference to this summary, the following detailed description, and the accompanying drawings.

BRIEF DESCRIPTION OF THE DRAWINGS

The systems and methods described herein may be better understood with reference to the following drawings and detailed description. Non-limiting and non-exhaustive embodiments are described with reference to the following drawings.

DETAILED DESCRIPTION

Detailed embodiments of the present disclosure are provided herein. Any and all disclosed embodiments are merely exemplary and may be embodied in various and alternative forms, and combinations thereof. As used herein, "exemplary," and similar terms, may refer expansively to embodiments that serve as an illustration, specimen, model, or pattern. The figures may include exaggerated or minimized features, in order to adequately show details of particular components. In certain instances, well-known components, systems, materials or methods that have not been described in detail in order to avoid obscuring from the focus of the present disclosure. Therefore, specific structural and functional details disclosed herein are in no way to be interpreted as limiting, but merely as a basis for the claims and as a representative basis recognizable to one skilled in the art to employ the present disclosure.

Figure 1:
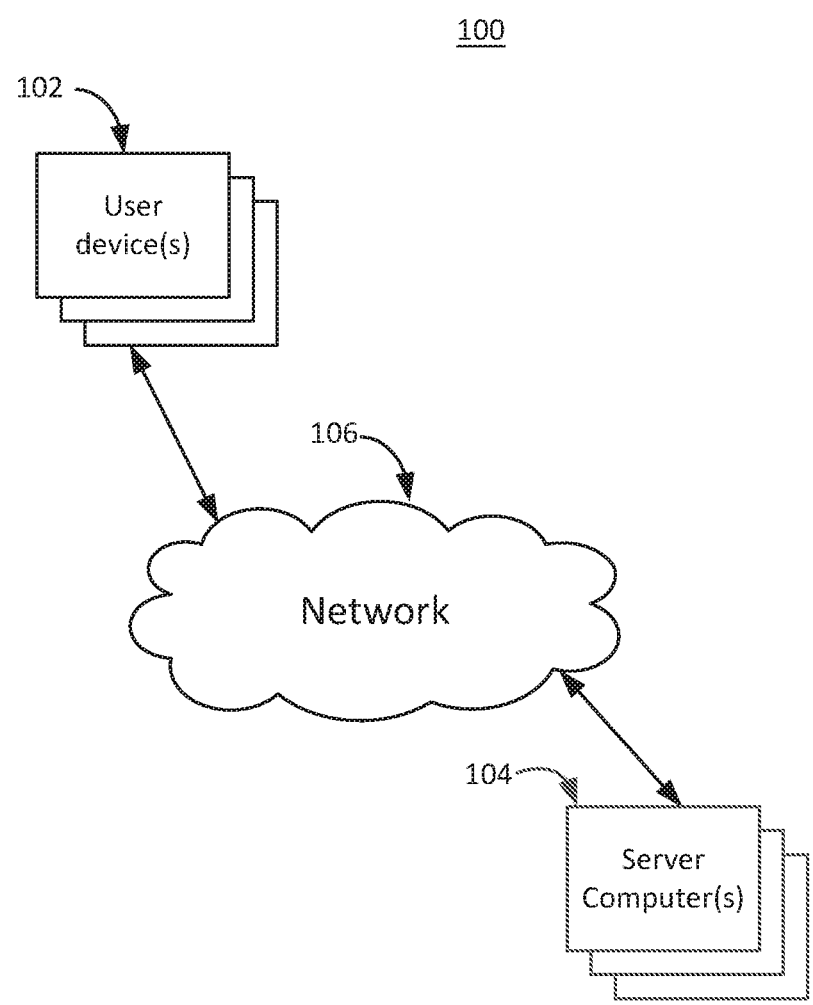
FIG. 1 is an exemplary block diagram of an environment in accordance with the embodiments of the present disclosure.

FIG. 1 is a block diagram illustrating one embodiment of an environment in which exemplary embodiments of the invention may be practiced. Not all the components may be required to practice various embodiments, and variations in the arrangement and type of the components may be made. As shown, system 100 includes network 106, one or more server computers 104, and one or more user devices 102. User device 102 may include for example, smartphones, tablets, desktop and laptop PCs, etc. Server(s) 104 may vary widely in configuration or capabilities, but generally may include, a CPU (not shown) coupled to memory (not shown). One or more server computers 104 may also include one or more wired or wireless network interfaces (not shown), one or more input/output interfaces (not shown), or one or more operating systems (not shown), such as Windows Server, Mac OS X, Unix, Linux, FreeBSD, or the like. Devices capable of operating as a server may include, as examples, dedicated rack-mounted servers, desktop computers, laptop computers, integrated devices combining various features, such as two or more features of the foregoing devices, or the like.

Network 106 is configured to couple network devices with other computing devices. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 106. Furthermore, remote computers and other related electronic devices could be remotely connected to either LANs or WANs via a modem and temporary telephone link. In essence, network 106 includes any communication method by which information may travel between computing devices. As will be apparent to one of ordinary skill in the art, a distributed system is a software system in which components located on networked computers (e.g., server computers 104) communicate and coordinate their actions by passing messages. The components interact with each other in order to achieve a common goal. Accordingly, distributed computing refers to the use of distributed systems to solve computational problems. In distributed computing, a problem is divided into a number of tasks, each of which is solved by one or more processes running on one or more computers (e.g., server computer 104), which communicate with each other by passing messages.

As used herein, "distributed" in terms such as "distributed system", may refer to computer networks where individual computers are physically distributed within some geographical area. In addition, "distributed" may also refer to autonomous processes that run on the same physical computer and interact with each other by message passing. While there is no single definition of a distributed system, distributed systems typically include several autonomous computational entities which communicate with each other by passing messages. Computational entities may be referred to as nodes or processes. A distributed system may have a common goal, such as solving a large computational problem. Alternatively, or in addition, each node may have its own user with individual needs, and the purpose of the distributed system may be to coordinate the use of shared resources or provide service(s) to user(s) (e.g., user devices 102). One way to implement a distributed system is through a client/server architecture. In this architecture, one or more servers (e.g., server computers 104) may provide a service, and one or more clients (e.g., user devices 102) communicate with the server to consume its products. In this architecture, clients and servers have different jobs. The server's job is to respond to service requests from clients, while a client's job is to use the data provided in response in order to perform some tasks.

Figure 2:
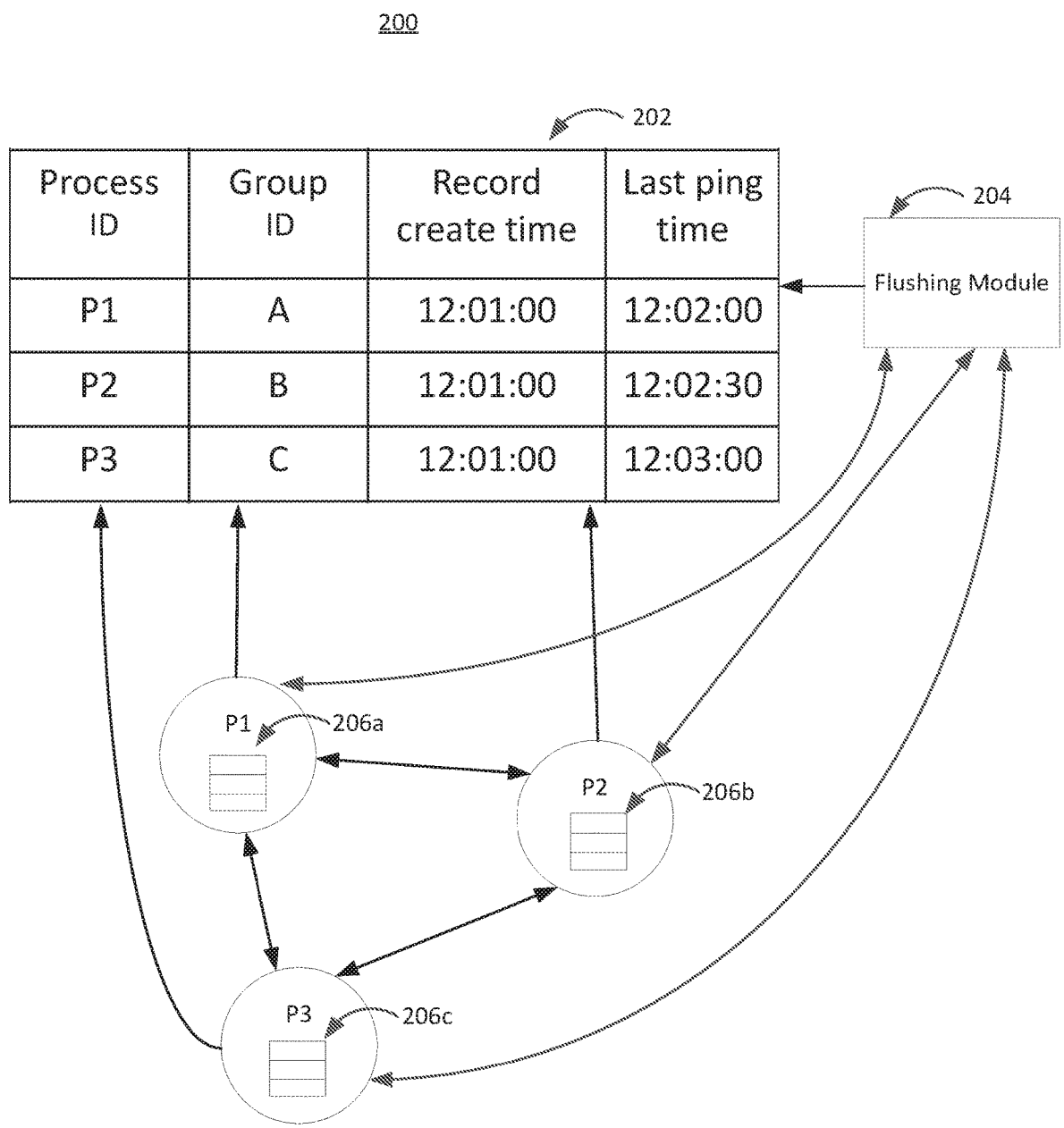
FIG. 2 illustrates an exemplary block diagram illustrating concurrently running processes in accordance with the embodiments of the present disclosure.

FIG. 2 illustrates an exemplary block diagram illustrating concurrently running processes in accordance with the embodiments of the present disclosure. As shown, a process registry 202 stores information related to processes P1, P2 and P3. Registry 202 includes fields process ID, group ID, record create time, and last ping time. Although these four fields are shown, any number of fields may be used. Process ID, used to identify a process, may be a globally unique identifier which may be a string, number or a combination thereof. Similarly group ID, used to identify the group to which a process belongs, may be a string, number or a combination thereof. Record create time refers to a time at which the registry entry for a process was created. Last ping time refers to the time at which a process last communicated with the registry. In one embodiment, registry 202 may be stored on a central server computer, and processes P1, P2, and P3 may include local copies 206a, 206b, and 206c, respectively, of process registry 202 provided by the server computer. Processes P1, P2 and P3 may read process registry 202 to update local copies 206a, 206b, and 206c. In one embodiment, processes query/read registry 202 and update their respective local copies on a predetermined schedule, e.g., every 2 minutes. In one embodiment, processes may be configured to read/query registry 202 at the same moment in time. Alternatively, or in addition, processes may read registry 202 and update their respective local copies when they receive up/down broadcast messages from other processes. "Up"/"down" messages are messages which may be broadcast by a process when the process starts running ("up") or stops running ("down"). In one embodiment, processes P1, P2, and P3 may be configured to periodically broadcast their status (e.g., "still alive") via messages sent to one or more other processes and to registry 202. In one embodiment, this broadcast of status may be in response to polling by, for example, flushing module 204. In addition, processes P1, P2, and P3 may be configured to broadcast up/down messages to one or more other processes and to registry 202 when they start/stop running.

When it is determined that a process has stopped running, its entry may be removed from process registry 202 by flushing module 204. In one embodiment, flushing module 204 may be implemented as a software module. A process may be determined to have stopped running when a message hasn't been received from the process within a predetermined time period. For example, if a message from a process hasn't been received within the last five minutes, then it is likely that the process has stopped running. In one embodiment, since processes may be periodically querying registry 202 as discussed above, the absence of a query from a process within a predetermined time period may be used to determine that the process has likely stopped running. Alternatively, if the last ping time for a process is prior to a predetermined time, then it may be determined that the process has stopped running. For example, any process that has a last ping time prior to 12:03:00 may be determined to have stopped running.

When a process has stopped running and has been removed from registry 202, the remaining processes may select a master process using an algorithm:

primary master process index=[((time+offset)/rotate period) % no. of processes]

In the above algorithm, time may be the current coordinated universal time (UTC time) as defined by the International Telecommunications Union. In the above algorithm, "%" refers to the modulo operation. Number of processes, abbreviated as "no. of processes" above, is the number of running processes in the registry. In one embodiment, the master process is periodically rotated using the above algorithm even if a process has not stopped running. For example, a new master process may be selected every 10 seconds. Rotate period, as used above, may be a time period which specifies the rotation schedule, e.g., every 30 seconds. The offset variable is used to shift the time at which the algorithm triggers. For example, an offset of 30 minutes will delay the master process selection process by 30 minutes. In one embodiment, the above algorithm will result in an index, which may then be used to select a process from the registry. For example, if the result of the algorithm is 1 (i.e., primary master process index=1), the process whose index is 1 in the registry may be selected as the master process.

In one embodiment, to create redundancy in the system, multiple master processes may be allowed. For example, there may be a primary master process and a secondary master process. The secondary master process may be selected using an algorithm such as:

secondary master process index=[(primary master process index+1) % no. of processes]

In other words, the secondary master process is selected by calculating a secondary master process index value using the primary master process index value.

When a process goes down without broadcasting a "down" message, it creates a hole in the execution cycle. This is corrected when the process is flushed from the registry by flushing module 204. By rotating the master process using the above algorithm, a bad node or process only results in a fractional loss of execution (as opposed to 100% loss of the execution cycle if using a fixed master process). For example, if there are 10 processes rotating every 10 seconds and it takes 5 minutes before a down process is flushed, only 30 seconds of execution time is lost.

Figure 3:
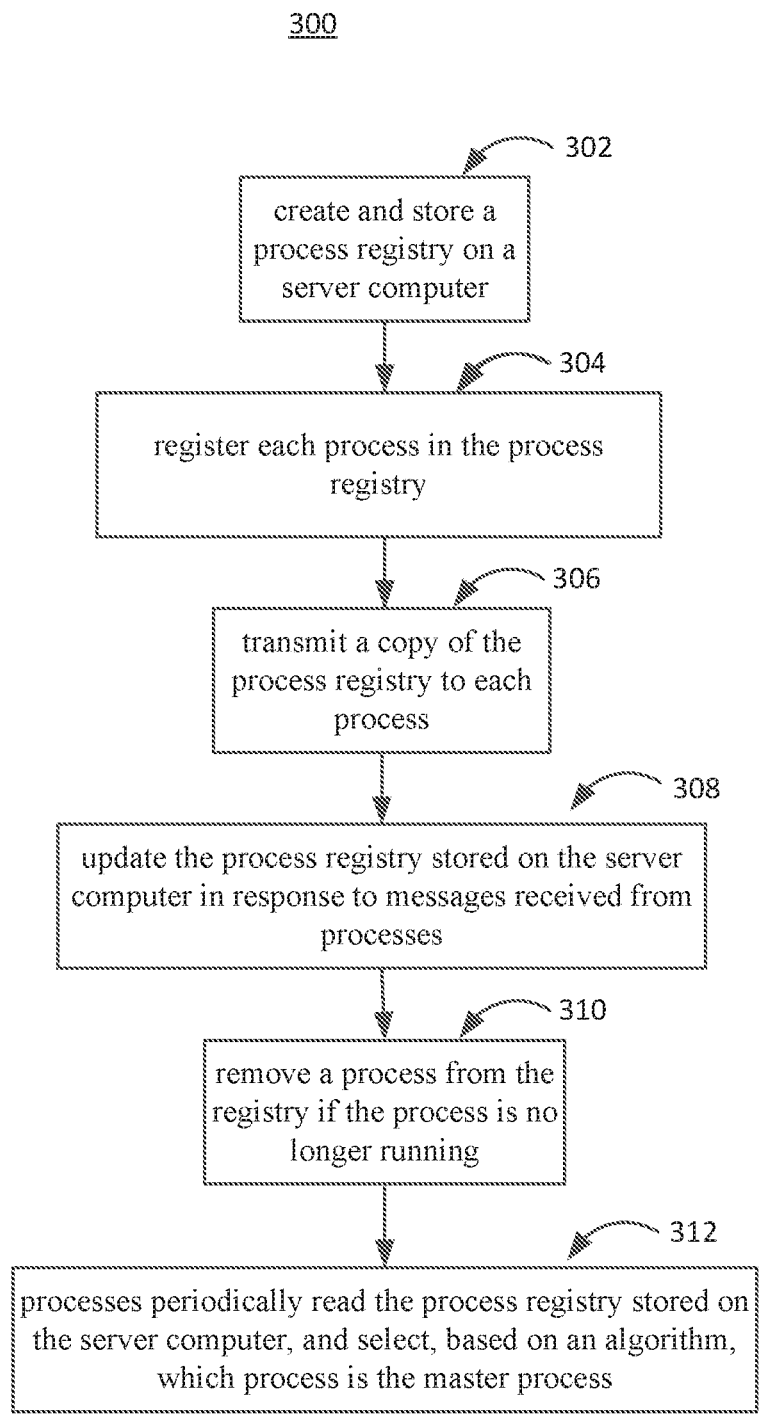
FIG. 3 illustrates an exemplary flow diagram of a method in accordance with the embodiments of the present disclosure.

FIG. 3 illustrates an exemplary flow diagram showing an algorithm in accordance with the embodiments described herein. Method 300, as shown, illustrates an algorithm for coordinating execution among processes to limit concurrent execution to a known level. Method 300 also enables distributing (or not distributing) execution over time among a population of processes, and minimizes load on system resources. At step 302, a process registry may be created and stored on a server computer. In one embodiment, the registry may comprise a table. The table may include fields such as, for example, a globally unique process identifier (may be a string, number, or a combination), group (may be a string, number, or a combination), record create time, and last ping time. The process identifier field stores an ID for each process. The group field identifies the group to which the process belongs. The record create time field stores the time at which a particular entry for a process was created. The last ping time field stores the time at which a process last pinged the registry.

At step 304, each process may be registered in the process registry by storing at least unique identifiers corresponding to each process. The unique identifiers may be stored in the table described above.

At step 306, a copy of the process registry may be transmitted to each process. In one embodiment, each process maintains a local copy of the process registry and each process may periodically broadcast a message indicating a status of the process to the server and to all other processes.

At step 308, the process registry stored on the server computer may be updated in response to the received message. For example, if a process broadcasts that it is no longer running, the registry may be updated to reflect the status of that process.

At step 310, a process is removed from the registry if it is determined that the process is no longer running. In one embodiment, a process is determined to no longer be running if a message has not been received from the process within a predetermined amount of time. For example, if a message hasn't been received from a process within the last 5 minutes, then it may be determined that the process is likely not running and should be removed from the registry. Alternatively, since processes may be periodically querying the process registry, the absence of a query from a process within a predetermined time period may be used to determine that the process has likely stopped running. Further, if the last ping time for a process is prior to a predetermined time, then it may be determined that the process has stopped running.

At step 312, each process may periodically read the process registry stored on the server computer, and select, based on an algorithm, which process of the plurality of processes is a master process. The processes may be configured to read the process registry on a predetermined schedule (e.g., every 5 minutes) and/or when processes receive broadcast messages from other processes. The processes may use the following algorithm to select a master process:

primary master process index=[((time+offset)/rotate period) % no. of processes]

In the above algorithm, time may be the current coordinated universal time (UTC time) as defined by the International Telecommunications Union. In above algorithm, "%" refers to the modulo operation. Number of processes, abbreviated as "no. of processes" above, is the number of running processes in the registry. The above algorithm may be used to transition a node when a node goes down (i.e., stops running). In one embodiment, the master process is periodically rotated using the above algorithm even if a process has not stopped running. For example, a new master process may be selected every 10 seconds. Rotate period, as used above, may be a time period which specifies the rotation schedule, e.g., every 30 seconds. The offset variable is used to shift the time at which the algorithm triggers. For example, an offset of 30 minutes will delay the master process selection process by 30 minutes. In one embodiment, the above algorithm will result in an index, which may then be used to select a process from the registry. For example, if the result of the algorithm is 1 (i.e., primary master process index=1), the process whose index is 1 in the registry may be selected as the master process.

In one embodiment, to create redundancy in the system, multiple master processes may be allowed. For example, there may be a primary master process and a secondary master process. The secondary master process may be selected using an algorithm such as:

secondary master process index=[(primary master process index+1) % no. of processes]

It shall be understood that each block of a flowchart illustration need not be limited in the ordering shown in the illustration, and might be performed in any ordering, or even performed concurrently, without departing from the spirit of the embodiments described herein. It will also be understood that each block of the flowchart illustration, and combinations of blocks in the flowchart illustration, can be implemented by execution of computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 4:
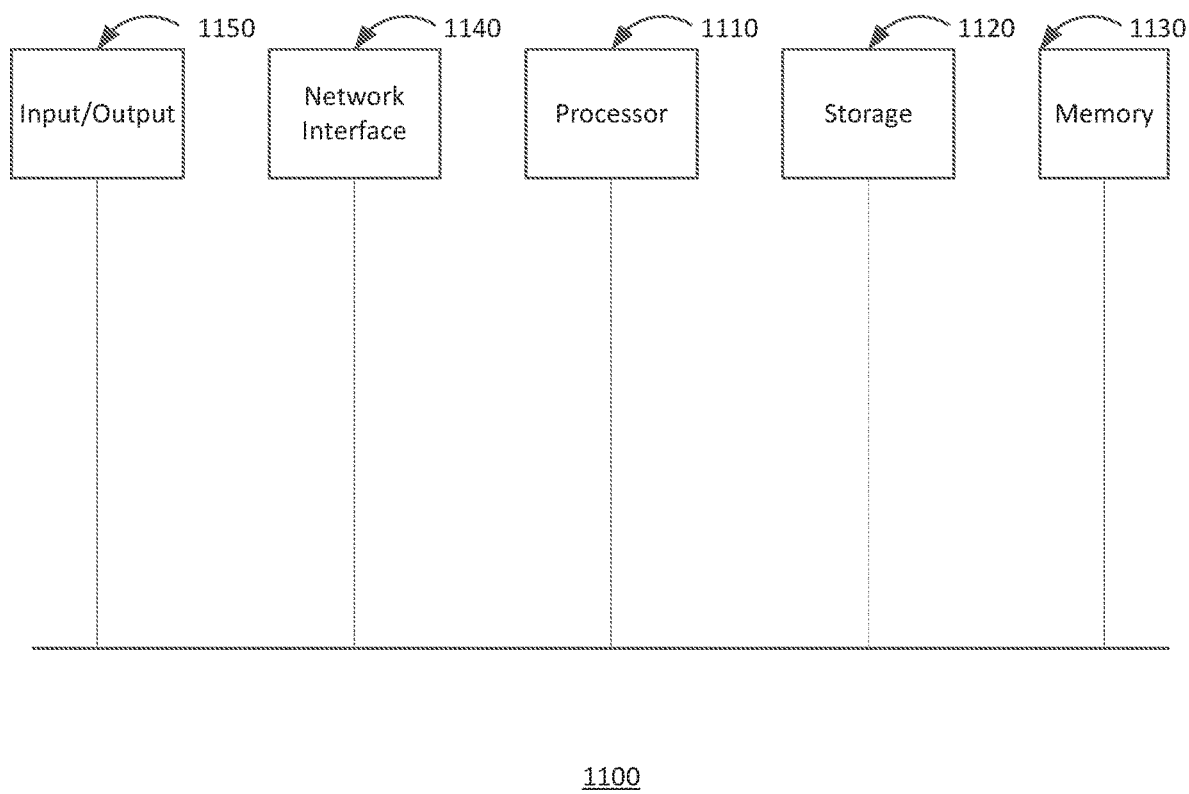
FIG. 4 illustrates a high-level diagram of a computing device that may be used to implement various aspects of the present disclosure.

FIG. 4 illustrates a high-level diagram of a computing device that may be used to implement various aspects of the present disclosure. Computing device 1100 comprises a processor 1110 operatively coupled to a data storage device 1120 and a memory 1130. Processor 1110 controls the overall operation of computing device 1100 by executing computer program instructions that define such operations. The computer program instructions may be stored in data storage device 1120, or other computer readable mediums, and loaded into memory 1130 when execution of the computer program instructions is desired. Thus, at least the method steps of FIG. 3 can be defined by the computer program instructions stored in memory 1130 and/or data storage 1120 and controlled by processor 1110 executing the computer program instructions. For example, the computer program instructions can be implemented as computer executable code programmed by one skilled in the art to perform at least the algorithms defined by the method steps of FIG. 3. Computing device 1100 also includes one or more network interfaces for communicating with other devices via a network. Computing device 1100 also includes one or more input/output devices 1150 that enable user interaction with computing device 1100 (e.g., display, keyboard, mouse, speakers, buttons, etc.).

Processor 1110 may include both general and special purpose microprocessors, and may be the sole processor or one of multiple processors of computing device 1100. Processor 1110 may comprise one or more central processing units (CPUs), for example. Processor 1110, data storage device 1120, and/or memory 1130 may include, be supplemented by, or incorporated in, one or more application-specific integrated circuits (ASICs) and/or one or more field programmable gate arrays (FPGAs).

Data storage 1120 and memory 1130 each comprise a tangible non-transitory computer readable storage medium. Data storage 1120, and memory 1130, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1150 may include peripherals, such as a printer, scanner, display screen, etc. For example, input/output devices 1150 may include a display device such as a cathode ray tube (CRT) or liquid crystal display (LCD) monitor for displaying information to the user, a keyboard, and a pointing device such as a mouse or a trackball by which the user can provide input to computing device 1100.

One skilled in the art will readily recognize that any implementation of an actual computer, computer system, or computing device may have other structures and may contain other components, and that computing device 1100 is merely a high level representation of some of the components for illustrative purposes.

All systems and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

All systems and methods described herein may also be implemented using computers operating in a client-server relationship. Typically, in such a system, the client computer is located remotely from the server computer and interaction takes place via a network. The client-server relationship may be defined and controlled by computer programs executing on their respective client and server computers.

All systems and methods described herein may be implemented using a computer program product tangibly embodied in an information carrier, e.g., in a non-transitory machine-readable storage, for execution by a programmable processor; and the method steps described herein may be implemented using one or more computer programs executable by such processor. A computer program may be a set of computer program instructions that can be used, directly or indirectly, by a computer to perform a certain activity or bring about a certain result. A computer program may be written in any form of programming language, including compiled or interpreted languages, and may be deployed in any form, including as a stand-alone program or as a module, component, subroutine, or other unit suitable for use in a computing environment.

The foregoing detailed description of the present disclosure is to be understood as being in every respect illustrative and exemplary, but not restrictive, and the scope of the present disclosure provided herein is not to be determined solely from the detailed description, but rather from the claims as interpreted according to the full breadth and scope permitted by patent laws. It is to be understood that the embodiments shown and described herein are merely illustrative of the principles addressed by the present disclosure and that various modifications may be implemented by those skilled in the art without departing from the scope and spirit of the present disclosure. Those skilled in the art may implement various other feature combinations without departing from the scope and spirit of the present disclosure. The various functional modules shown are for illustrative purposes only, and may be combined, rearranged and/or otherwise modified.

The invention claimed is:

1. A method, comprising:
    determining that a particular process of a plurality of processes registered with a process registry is not running based on a message received from at least one process of the plurality of processes;
    in response to determining that the particular process is not running, removing the particular process from the process registry; and
    in response to removing the particular process from the process registry, selecting a master process from remaining processes registered with the process registry based on a length of time the selected master process would be the master process and a number of processes registered with the process registry according to: index=[((time+offset)/rotate period) % no. of processes].

2. The method of claim 1, further comprising:
    periodically selecting a new master process at predetermined time intervals.

3. The method of claim 1, further comprising:
    selecting a secondary master process from the process registry based on the master process.

4. The method of claim 3, wherein selecting a secondary master process from the process registry based on the master process comprises:
    calculating a secondary master process index as [(master process index+1) % no. of processes]; and
    selecting the secondary master process from the process registry based on the secondary master process index.

5. The method of claim 1, wherein the message received from the at least one process indicates that the at least one process is running or that the at least one process is not running.

6. The method of claim 1, wherein determining that a particular process of a plurality of processes registered with a process registry is not running based on a message received from at least one process of the plurality of processes comprises:
    determining that the message received from the at least one process does not include a message received from the particular process.

7. The method of claim 1, wherein selecting a master process from remaining processes registered with the process registry is performed by the plurality of processes registered with the process registry.

8. The method of claim 1, further comprising:
    registering the plurality of processes with the process registry by associating each of the plurality of processes with an index in the process registry.

9. The method of claim 1, wherein each of the plurality of processes registered with the process registry maintains a local copy of the process registry.

10. A non-transitory computer readable medium storing computer program instructions, which, when executed on a processor, cause the processor to perform operations comprising:
    determining that a particular process of a plurality of processes registered with a process registry is not running based on a message received from at least one process of the plurality of processes;
    in response to determining that the particular process is not running, removing the particular process from the process registry; and
    in response to removing the particular process from the process registry, selecting a master process from remaining processes registered with the process registry based on a length of time the selected master process would be the master process and a number of processes registered with the process registry according to: index=[((time+offset)/rotate period) % no. of processes].

11. The non-transitory computer readable medium of claim 10, the operations further comprising:
    periodically selecting a new master process at predetermined time intervals.

12. The non-transitory computer readable medium of claim 10, the operations further comprising:
    selecting a secondary master process from the process registry based on the master process.

13. The non-transitory computer readable medium of claim 12, wherein selecting a secondary master process from the process registry based on the master process comprises:
calculating a secondary master process index as [(master process index+1) % no. of processes]; and
selecting the secondary master process from the process registry based on the secondary master process index.

14. The non-transitory computer readable medium of claim 10, wherein the message received from the at least one process indicates that the at least one process is running or that the at least one process is not running.

15. An apparatus comprising:
a processor; and
a memory to store computer program instructions, the computer program instructions when executed on the processor cause the processor to perform operations comprising:
determining that a particular process of a plurality of processes registered with a process registry is not running based on a message received from at least one process of the plurality of processes;
in response to determining that the particular process is not running, removing the particular process from the process registry; and
in response to removing the particular process from the process registry, selecting a master process from remaining processes registered with the process registry based on a length of time the selected master process would be the master process and a number of processes registered with the process registry according to: index=[((time+offset)/rotate period) % no. of processes].

16. The apparatus of claim 15, the operations further comprising:
periodically selecting a new master process at predetermined time intervals.

17. The apparatus of claim 15, wherein determining that a particular process of a plurality of processes registered with a process registry is not running based on a message received from at least one process of the plurality of processes comprises:
determining that the message received from the at least one process does not include a message received from the particular process.

18. The apparatus of claim 15, wherein selecting a master process from remaining processes registered with the process registry is performed by the plurality of processes registered with the process registry.

19. The apparatus of claim 15, the operations further comprising:
registering the plurality of processes with the process registry by associating each of the plurality of processes with an index in the process registry.

20. The apparatus of claim 15, wherein each of the plurality of processes registered with the process registry maintains a local copy of the process registry.

* * * * *